US009394672B2

(12) United States Patent
Judkins et al.

(10) Patent No.: US 9,394,672 B2
(45) Date of Patent: *Jul. 19, 2016

(54) RECLAMATION OF POTABLE WATER FROM MIXED GAS STREAMS

(71) Applicant: UT-Battelle, LLC, Oak Ridge, TN (US)

(72) Inventors: Roddie R. Judkins, Knoxville, TN (US); Brian L. Bischoff, Knoxville, TN (US); Melanie Moses Debusk, Knoxville, TN (US); Chaitanya Narula, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/915,182

(22) Filed: Jun. 11, 2013

(65) Prior Publication Data
US 2013/0276632 A1 Oct. 24, 2013

Related U.S. Application Data

(63) Continuation of application No. 13/071,223, filed on Mar. 24, 2011, now Pat. No. 8,511,072.

(51) Int. Cl.
*F01N 3/00* (2006.01)
*E03B 3/00* (2006.01)
*B01D 53/00* (2006.01)
*B01D 53/26* (2006.01)
*B01D 53/22* (2006.01)

(52) U.S. Cl.
CPC .............. *E03B 3/00* (2013.01); *B01D 53/002* (2013.01); *B01D 53/265* (2013.01); *B01D 53/229* (2013.01); *B01D 2257/80* (2013.01);
(Continued)

(58) Field of Classification Search
USPC .......... 60/274, 295, 297, 309, 310, 311, 317, 60/324; 55/327, 462, 434.2, 437; 95/55, 95/117, 118, 231
See application file for complete search history.

(56) References Cited

U.S. PATENT DOCUMENTS 4,656,831 A 4/1987 Budininkas et al.
4,725,359 A 2/1988 Ray
(Continued)

FOREIGN PATENT DOCUMENTS

DE 19850557 5/2000
EP 1925355 5/2008
WO 2009140237 11/2009

OTHER PUBLICATIONS

Atkinson, "Purification system produces potable water from emissions", Membrane Technology (Jul. 2005) 7: 7-8.
(Continued)

*Primary Examiner* — Binh Q Tran
(74) *Attorney, Agent, or Firm* — Novak Druce Connolly Bove + Quigg LLP

(57) ABSTRACT

An apparatus for separating a liquid from a mixed gas stream can include a wall, a mixed gas stream passageway, and a liquid collection assembly. The wall can include a first surface, a second surface, and a plurality of capillary condensation pores. The capillary condensation pores extend through the wall, and have a first opening on the first surface of the wall, and a second opening on the second surface of the wall. The pore size of the pores can be between about 2 nm to about 100 nm. The mixed gas stream passageway can be in fluid communication with the first opening. The liquid collection assembly can collect liquid from the plurality of pores.

25 Claims, 7 Drawing Sheets

(52) U.S. Cl.
CPC ....... *B01D2258/01* (2013.01); *B01D 2258/012* (2013.01); *B01D 2259/4566* (2013.01)

(56) References Cited

U.S. PATENT DOCUMENTS

| | | | |
|---|---|---|---|
| 6,490,862 | B1 | 12/2002 | Beerlage et al. |
| 6,581,375 | B2 | 6/2003 | Jagtoyen et al. |
| 6,875,247 | B2 * | 4/2005 | TeGrotenhuis et al. .......... 55/319 |
| 7,000,409 | B2 | 2/2006 | Mazzetti |
| 7,272,941 | B2 | 9/2007 | TeGrotenhuis et al. |
| 7,389,639 | B2 | 6/2008 | Michalakos et al. |
| 7,404,840 | B2 * | 7/2008 | Wood et al. ...................... 55/523 |
| 7,484,626 | B2 | 2/2009 | Judkins |
| 7,537,702 | B2 | 5/2009 | Lupton et al. |
| 7,566,426 | B2 | 7/2009 | Zuberi |
| 7,666,376 | B2 | 2/2010 | Dornseiffer et al. |
| 8,043,418 | B2 * | 10/2011 | Ruud et al. ........................... 96/4 |
| 8,057,766 | B2 * | 11/2011 | Ogyu et al. .................... 423/212 |
| 8,337,762 | B2 | 12/2012 | Vakkilainen et al. |
| 8,353,155 | B2 | 1/2013 | Lewis et al. |
| 8,511,072 | B2 * | 8/2013 | Judkins et al. ................... 60/297 |
| 2002/0011075 | A1 | 1/2002 | Faiqih |
| 2002/0139127 | A1 | 10/2002 | Kesten et al. |
| 2008/0134895 | A1 | 6/2008 | Ruud et al. |
| 2009/0084728 | A1 | 4/2009 | Kirts |
| 2009/0314477 | A1 | 12/2009 | Thomas et al. |
| 2010/0180765 | A1 | 7/2010 | Son et al. |
| 2010/0282455 | A1 | 11/2010 | Maegawa et al. |
| 2011/0138793 | A1 | 6/2011 | Coletta |

OTHER PUBLICATIONS

Bhave, "Inorganic membranes synthesis, characteristics and applications", Van Norstrand Reinhold (1992): 19-25.
Dusenbury, "Military land-based water purification and distribution program", RTO-MP-HFM-086: 1-14.
Frazer, "Aquatic alchemy", Environmental Health Perspectives (Feb. 2005) 113(2): A110-A114.
International Search Report mailed on Aug. 21, 2012 in PCT Application No. PCT/US2012/030558, international filed Mar. 26, 2012. (5 pages).

* cited by examiner

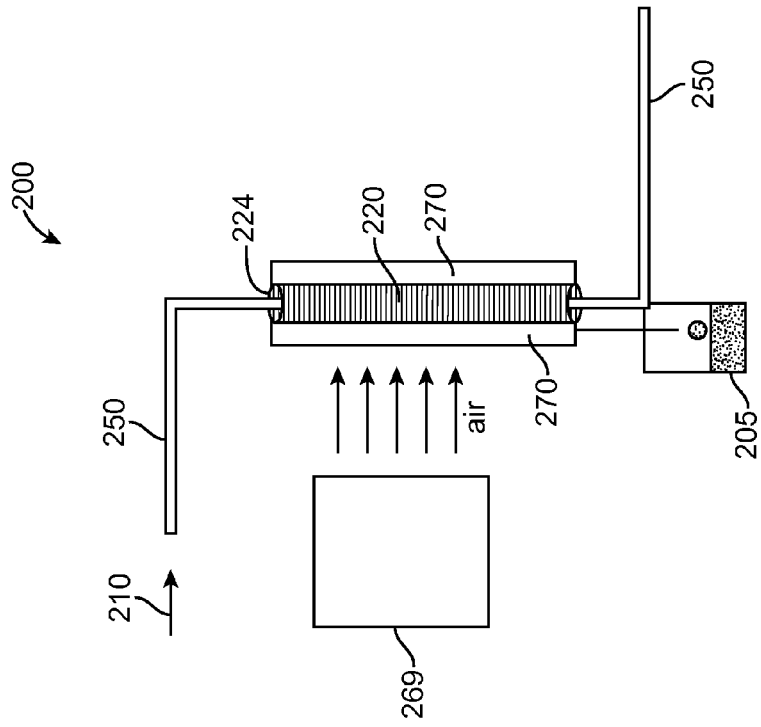
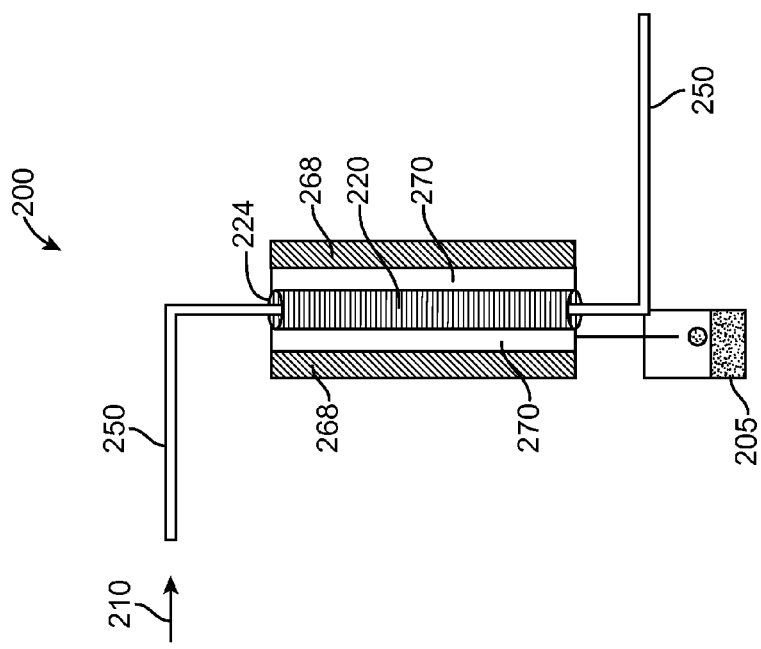

According to Kelvin Equation Calculations
(10% water vapor at 1 atmosphere)

| Membrane Temperature | % H₂O Recovery | | |
|---|---|---|---|
| | Thermodynamic Condensation | 6 nm Inorganic Membrane | 3 nm Inorganic Membrane |
| 30°C | 58% | 72% | 85% |
| 40°C | 27% | 50% | 72% |
| 50°C | --- | 16% | 52% |
| 60°C | --- | --- | 14% |

RECLAMATION OF POTABLE WATER FROM MIXED GAS STREAMS

CROSS REFERENCE TO RELATED APPLICATIONS

This application is a continuation of application of U.S. Nonprovisional application Ser. No. 13/071,223, filed Mar. 24, 2011, entitled "RECLAMATION OF POTABLE WATER FROM MIXED GAS STREAMS," the entirety of which is incorporated herein by reference.

STATEMENT REGARDING FEDERALLY SPONSORED RESEARCH OR DEVELOPMENT

This invention was made with government support under DE-AC05-00OR22725 awarded by the United States Department of Energy. The Government has certain rights in the invention.

FIELD OF THE INVENTION

This disclosure relates to the field of reclamation of liquid from a mixed gas stream, and more particularly to apparatus and methods of reclaiming water from mixed gas streams.

BACKGROUND OF THE INVENTION

During military field operations, a soldier in the field needs about 6.6 gallons (54.8 pounds) of water per day for drinking, personal hygiene, meal rehydration, and emergency medical treatment. The high risk of chemical and biological contamination and/or limited supply in locally available water near battlefields requires that a large quantity of water be transported to ensure its suitability for human consumption. The transport of such large amounts of water in support of field operations strains logistical resources. The need to transport water can be significantly reduced if water can be reclaimed and purified from alternate sources, such as engine exhaust, waste water from kitchens and showers, and human waste.

Diesel exhaust typically contains approximately 10% water vapor. Assuming that an army uses approximately 12 million gallons of fuel per week, 100% reclamation of water produced from fuel consumption could provide about 12 million gallons of water per week. By employing standard thermodynamic water condensation, only about 50% of the water in exhaust containing 10% water vapor can be condensed. Because the exhaust contains soot particles, trace hydrocarbons, and acid gases such as $NO_2$ and $SO_2$, these contaminants would also reside in the water collected using thermodynamic condensation. Removal of these contaminants from the condensed water would require a potentially large filtration train potentially encompassing a large portion of the cargo area of a transport vehicle, and require the transportation of replacement filters and parts. For practical purposes in military field operations, there is a need for an improved system for water collection with higher reclamation efficiency and a smaller size.

SUMMARY OF THE INVENTION

An apparatus for separating a liquid from a mixed gas stream can include a wall having a first surface, a second surface, and a plurality of capillary condensation pores. The pores extend through the wall, and have a first opening on the first surface of the wall, a second opening on the second surface of the wall, and a pore size between about 2 nm to about 100 nm. A mixed gas stream passageway is in fluid communication with the first opening. A liquid collection assembly collects liquid from the at least one pore.

The wall can comprise a porous support layer and a porous condensation layer. The capillary condensation pores of the condensation layer can have a pore size of between about 2 nm and about 100 nm. The pores of the porous support layer can have a pore size of between about 0.1 and 50 µm.

The porous support layer can have a thickness between 0.1 mm and 4 mm, and the condensation layer can have a thickness of between 1 and 100 µm. The liquid collection assembly can further include a collection chamber for collecting the liquid from the second opening, and a liquid pump for removing liquid from the collection chamber. The pressure difference between the collection chamber and the mixed gas stream passageway can be between about 1 and 14.7 psi.

The apparatus can also include a cooling assembly for cooling at least a portion of the wall. The cooling assembly can have a conductive component, wherein a thermal conductivity of the conductive component is at least 50 W/mK. The conductive component can be a graphite foam. The cooling assembly can include a convective component. The convective component can be a fan for flowing air over at least a portion of the wall. The apparatus can have a filter assembly positioned upstream of the pores to remove particulates from the mixed gas stream.

The apparatus can include an engine. The engine can have an exhaust outlet and the mixed gas stream passageway can be in fluid communication with the exhaust outlet. The engine can be an internal combustion engine. The mixed gas stream can include water vapor and the liquid can include water.

A vehicle according to the invention can have an internal combustion engine having an exhaust outlet, an exhaust passageway, and a wall having a first surface, a second surface, and a plurality of capillary condensation pores. The capillary condensation pores extend through the wall, and have a first opening on the first surface of the wall, a second opening on the second surface of the wall, and a pore size between about 2 nm to about 100 nm. The exhaust outlet is in fluid communication with the exhaust passageway and the exhaust passageway is in fluid communication with the first opening.

A method of separating a liquid from a mixed gas stream includes the steps of providing a mixed gas stream; providing a wall having a first surface, a second surface, and a plurality of capillary condensation pores; wherein the capillary condensation pores extend through the wall, and have a first opening on the first surface of the wall, a second opening on the second surface of the wall, and a pore size between about 2 nm to about 100 nm; contacting the mixed gas stream with the at least one pore through the first opening on the first surface of the wall; separating a liquid from the mixed gas stream by capillary condensation in the at least one pore; and collecting the liquid exiting the second opening of the at least one pore.

The mixed gas stream can include an exhaust stream of an engine. The exhaust stream can have a flow rate between about 3600 L/min and 14000 L/min. The pore size of the pores is between about 3 nm to about 10 nm.

The separating step can further include adsorbing a portion of the liquid to the inner surface of the at least one pore, condensing liquid within the at least one pore, and forming a meniscus between the liquid and the mixed gas stream. The separating step can further include separating water as the liquid.

The method can further include the step of cooling at least a portion of the wall. The mixed gas stream can have an initial temperature of between about 150° C. to 400° C.; and the step of cooling can include cooling at least a portion of the wall to a temperature of between about 30° C. to 60° C. The method can also include the step of filtering the mixed gas stream upstream of the at least one pore.

BRIEF DESCRIPTION OF THE DRAWINGS

A fuller understanding of the present invention and the features and benefits thereof will be obtained upon review of the following detailed description together with the accompanying drawings of no particular scale, in which:

FIG. 3a is a schematic diagram of another exemplary reclamation apparatus;

FIG. 3b is a schematic diagram of another exemplary reclamation apparatus;

FIG. 6 is a table illustrating improved liquid recovery by the methods of the invention as compared to thermodynamic condensation.

Figure 1:
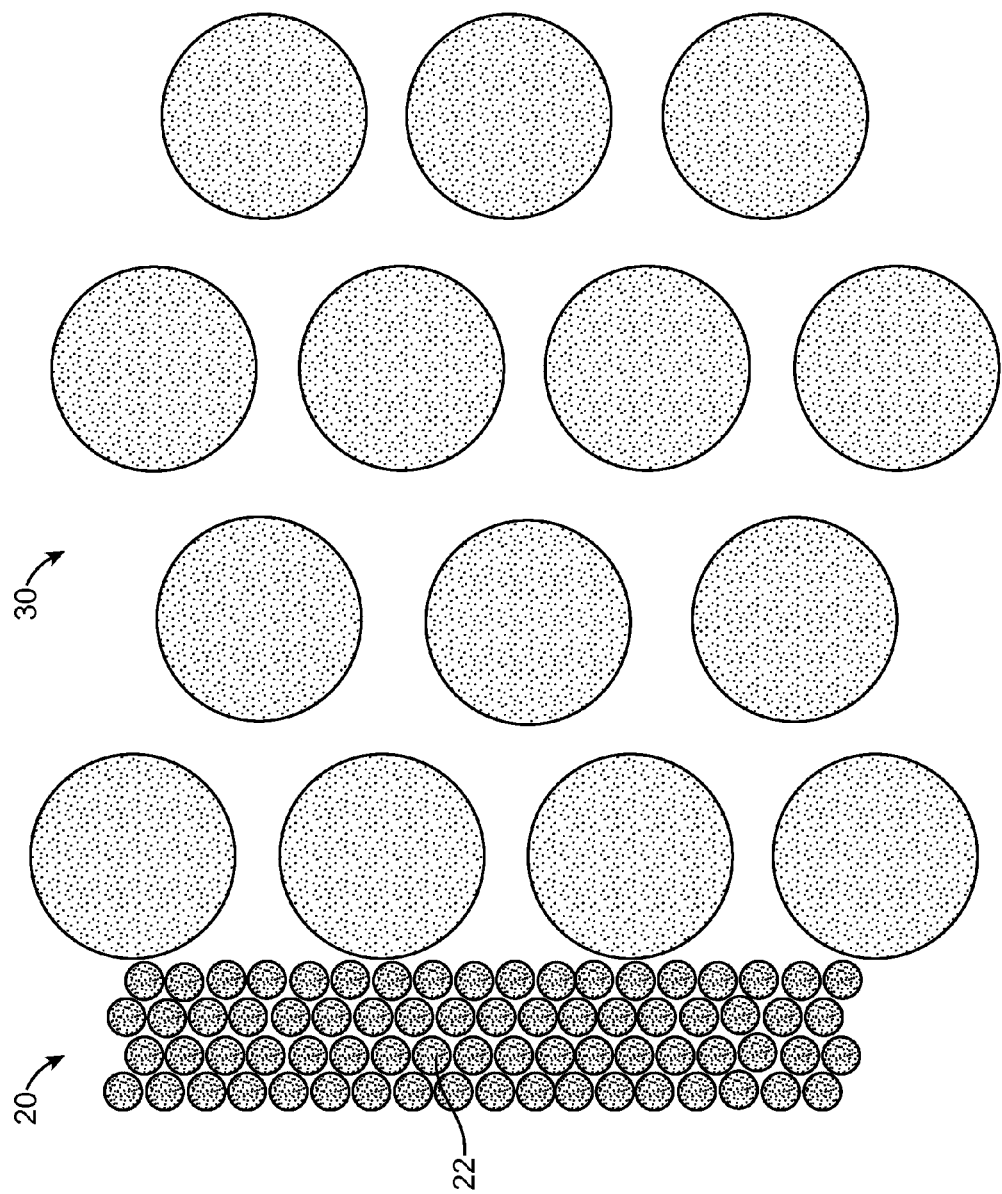
FIG. 1 is a schematic diagram of a porous condensation layer and supporting wall layer according to the invention.

For a better understanding of the present invention, together with other and further objects, advantages and capabilities thereof, reference is made to the following disclosure and appended claims in connection with the above-described drawings.

DETAILED DESCRIPTION OF THE INVENTION

An apparatus and method for separating liquid from a mixed gas stream, and particularly water ($H_2O$) from a mixed gas stream, are described herein. The apparatus for separating a liquid from a mixed gas stream can include a wall, a mixed gas stream passageway, and a liquid collection assembly. The wall can include a first surface, a second surface, and at least one capillary condensation pore. The pore can include an inner surface extending through the wall, a first opening on the first surface of the wall, and a second opening on the second surface of the wall. The size of the pore can be between about 2 nm to about 100 nm. The mixed gas stream passageway can be in fluid communication with the first opening. The liquid collection assembly can collect liquid from at least one capillary condensation pore.

As used herein, "mixed gas stream" refers to any gas stream containing more than one component, in which at least one component is condensable at atmospheric pressure or at the operating pressure of the system. Examples of a mixed gas stream can include flue gases and exhaust gases, which can include nitrogen ($N_2$), oxygen ($O_2$), and water vapor ($H_2O$) among other components. As used herein, the phrase "fluid communication" includes direct communication of liquid, gas, or a mixture of both, with the capillary condensation pore. Fluids include any liquid, gas, or mixture thereof, and can be a combination of different types of fluids.

As used herein, "wall" refers to any structure for containing the mixed gas stream and having capillary condensation pores for selectively permitting the passage of liquid through the pore. The material of the wall can be preferably resistant to corrosion by compounds in the mixed gas stream or in the surrounding environment. For example, the material of the wall can include ceramics and metals, including without limitation alumina, titania, and zirconia. The wall material is porous and the material is selected or constructed such that the pores have appropriate dimensions for capillary condensation. The material for the wall should be hydrophilic to promote capillary condensation. The wall should prevent the direct passage of the mixed gas stream into the liquid collection assembly to prevent contamination of the collected liquid.

The thickness of the wall can vary. A homogeneous membrane can be used, however it is currently preferred to employ a membrane comprising a porous support and a thin porous layer which will condense the water. The support can be comprised of material which will conduct heat, such as a conductive metal. The support and porous condensation layer should be as thin as possible or practical. In one embodiment, a 400 series stainless steel support is approximately 0.5 mm thick with a thin layer of aluminum oxide, 2-5 µm in thickness. The support should be less than 4 mm thick, preferably less than 1 mm and more preferably less than 0.5 mm. The porous condensation or separation layer should be less than 100 µm thick, preferably less than 20 µm, and more preferably less than 5 µm. Thicker condensation layers create a higher resistance to flow, and accordingly larger pressure drop is necessary to move the liquid through the layer.

The wall can be shaped in any suitable size, configuration, or form for a structure providing the capillary condensation pores between a mixed gas stream passageway and a liquid collection assembly. For example, the shape can include a single layer, multiple layers, a cylindrical duct, a rectangular duct, or multiple layers of such ducts.

The pore size of the condensing layer will vary depending on the operating characteristics such as the composition and flow rates of the mixed gas stream, the temperature and pressure of the mixed gas stream, and the liquid that is being condensed. For water, the pore size of the capillary condensation pore can be between about 2 nm to about 100 nm. As used herein, "pore size" refers to the average diameter within the pore, as the pore size of the porous material forming the porous condensation layer will be a distribution and the denoted pore size will be an average. The pore size can be selected to account for an adsorption layer that may coat the inner surface of the pore as described by the Kelvin equation. If an adsorption layer of liquid water about 1-2 monolayers thick (~4.5 Å) is adsorbed onto the pore walls, it can be seen that the pore diameter that is available for capillary condensation will be reduced by about 0.9 nm. Pore size can be between about 2 nm to about 100 nm and can include ranges from about 2 nm to 100 nm, or 3 nm to 10 nm, or 6 nm to 50 nm, or 15 nm to 100 nm, or any combination thereof, such as 2 nm to 10 nm and 50 nm to 100 nm. For example, pore size can include a minimum size of about 2 nm, 3 nm, 4 nm, 5 nm, 6 nm, 7 nm, 8 nm, 9 nm, 10 nm, 15 nm, 20 nm, 25 nm, 30 nm, or 40 nm. The minimum pore size for the capillary condensation of water is about 2 nm. Pore size can also include a maximum size of about 3 nm, 4 nm, 5 nm, 6 nm, 7 nm, 8 nm, 9 nm, 10 nm, 15 nm, 20 nm, 25 nm, 30 nm, 40 nm, 50 nm, or 75 nm. The average pore size for the porous support should be between 0.1 and 50 µm, preferably less than 25 µm, and more preferably less than 5 µm. As in the capillary condensation layer, the support pore size will have a distribution of sizes. For example, a support with an average pore size of 4 µm will have 90% of its pores between 1 and 8 µm.

The invention can include a plurality of capillary condensation pores with any number of pores in a given wall area, or pore distribution. The desired pore size of the wall can vary depending on the liquid being condensed, the concentration of liquid, the amount of liquid that is to be removed, and operating characteristics such as flow rate, pressure and temperature.

There is shown in FIG. 1 a schematic diagram of the construction of a capillary condensation system according to one aspect of the invention. The porous condensation layer 20 defines the capillary condensation pores 22, which are tortuous and irregular in size and shape. The porous condensation layer 20 is supported on a supporting wall layer 30, which is also porous and will thereby allow the passage of liquid that is condensed by the condensation layer 20. The pores 22 follow an irregular path but generally extend through the length of the porous condensation layer 20. The pore size distribution should be as narrow as possible. The presence of pores that are too large to provide capillary condensation will permit the mixed gas to flow through these pores and contaminate the condensed liquid.

Figure 2:
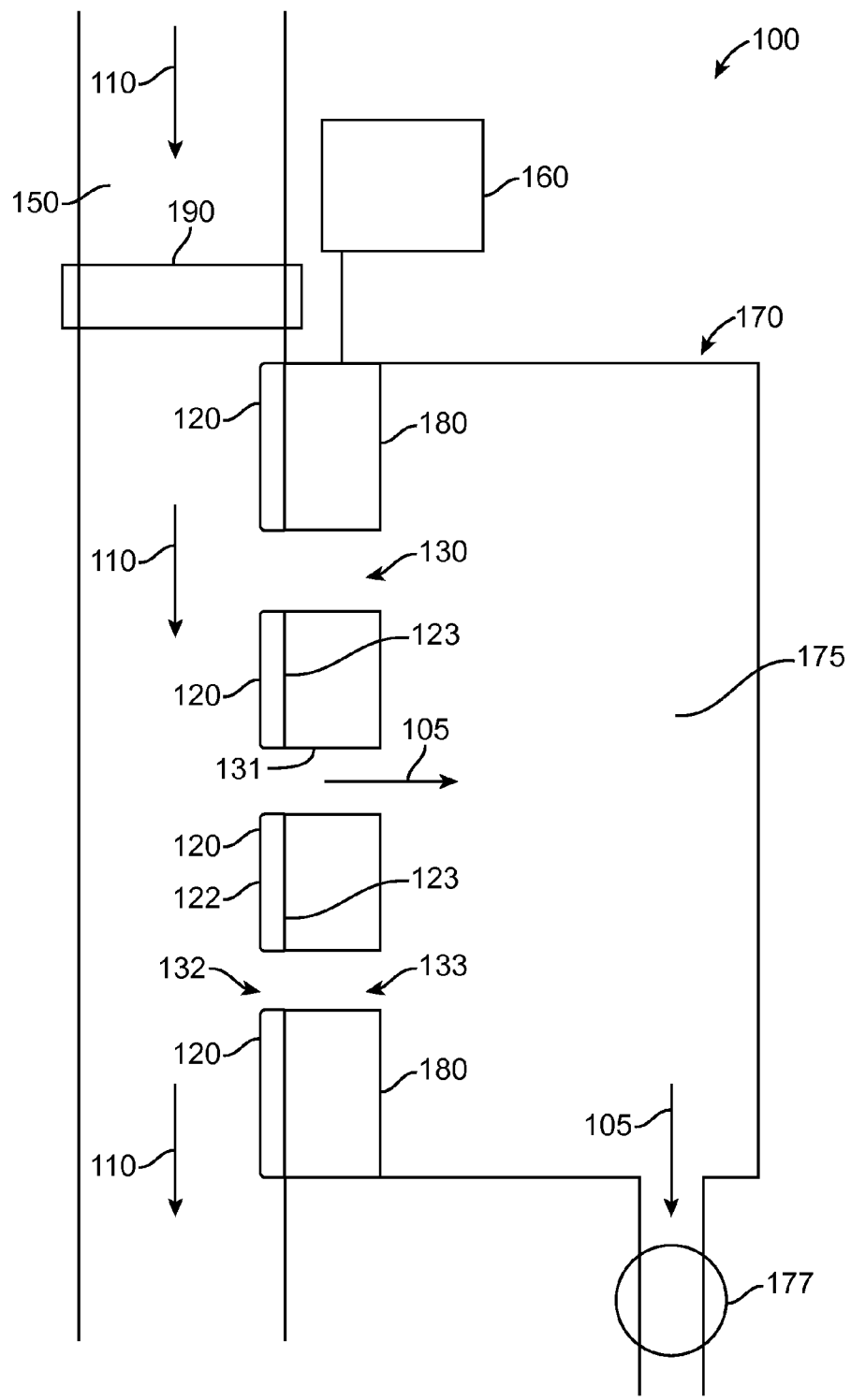
FIG. 2 is a schematic diagram of an exemplary reclamation apparatus.

FIG. 2 illustrates an embodiment of an apparatus 100 for separating a liquid 105 from a mixed gas stream 110 that can include a porous condensation layer 120, a mixed gas stream passageway 150 and a liquid collection assembly 170. The condensation layer 120 can include a first surface 122, a second surface 123, and at least one capillary condensation pore 130. The pore 130 can include pore surfaces 131 extending through the condensation layer 120, a first opening 132 on the first surface 122 of the wall, and a second opening 133 on the second surface 123 of the wall. Although the pores 130 can be cylindrical, it will be appreciated that in most instances the pores will be tortuous and irregular in shape as defined by the porous material making up the condensation layer and as shown in FIGS. 1-2.

The mixed gas stream passageway 150 can be in fluid communication with the first opening 132 of the pores 130. The mixed gas stream passageway 150 can be oriented in any suitable position such that at least a portion of a mixed gas stream travelling through the mixed gas stream passageway 150 will contact the first opening 132 of the pore 130. For example, a portion of a side wall of the mixed gas stream passageway 150 can include the first surface 122 of the condensation layer 120 or the condensation layer 120 can be a separate component within or in contact with the mixed gas stream passageway 150.

The liquid collection assembly 170 can be provided for collecting liquid 105 from the pores 130. As used herein, "liquid collection assembly" refers to any suitable structure or mechanism to collect, discharge or facilitate the removal of liquid that is discharged from the pores. In the embodiment illustrated in FIG. 2, the liquid collection assembly 170 includes a collection chamber 175 for collecting the liquid 105 from the second opening 133. The apparatus can also include a liquid pump assembly 177 for removing liquid 105 from the collection chamber 175. The liquid pump assembly 177 can include any suitable structure or mechanism to collect, discharge or facilitate the removal of liquid from the apparatus 100. The liquid pump 177 will generate at least a partial vacuum or pressure difference between the collection chamber 175 and the mixed gas stream passageway 150. The vacuum level between the pressure in the collection chamber 175 and the atmospheric pressure will vary. In one instance, the pressure difference between the mixed gas stream passageway 150 and the collection chamber 175 can be between about 0.1 and 0.5 bar, 1 to 7 psi, or 10 to 50 kPa. Other pressure differences are possible. The pressure difference displaces the liquid from the pores into the collection chamber, and so the necessary pressure drop will depend on the construction and operating characteristics of the particular system.

The apparatus 100 can also include a porous support layer 180 disposed on the second surface 123 of the condensation layer 120. The support layer 180 is porous so as to not significantly impede the removal of liquid from the pores 130. As used herein, "support layer" refers to any material suitable to make the wall more robust towards mechanical vibrations, flexure, or other external influences. The porous support layer 180 can also enhance corrosion resistance and/or thermal conductivity of the wall, and can include materials resistant to corrosion and suitable to carry heat away from the wall. The thermal conductivity of the material forming the support layer 180 can be at least 10 W/mK, at least 15 W/mK, at least 20 W/mK, or higher. The support layer material can include corrosion resistant metals such as 400 series stainless steel, copper, silver, and gold. The support layer can also be a non-metal material. The thickness of the support layer 180 will vary depending on the characteristics that the support layer is intended to impart to the wall.

The apparatus can also include a filter assembly 190 positioned upstream of the pore or plurality of pores 130 for filtering out at least a portion of particulates or other contaminants from the mixed gas stream. There are a variety of filters that can be used to collect particles from the mixed gas stream including air filters, electrostatic filters, honeycomb structures, and electrically heatable honeycomb and other structures. Among these, the preferred systems are ceramic honeycomb structures such as those made of corderites when used to purify a source of gases from engine emissions or those made of metals or conducting ceramics, for example silicon nitride doped silicon carbide, which can be resistively heated for stationary sources. The geometry of particulate filters and the channel distribution per square inch depends on the concentration of particles in the gas stream and its space velocity. For example, if the mixed gas stream includes diesel exhaust, the filter assembly can include a diesel particulate filter such as the catalytic particulate filters, including NOx adsorber catalyst and a diesel particulate filters (NAC+DPF), by Johnson Matthey of Malvern, Pa. or the DPXTM catalytic particulate filters by BASF of Iselin, N.J. Other filters and filtration methodologies are also possible.

The apparatus can also include a cooling assembly 160 for cooling at least a portion of the pores 130 in the condensation layer 120. As used herein, "cooling assembly" refers to any suitable mechanism to carry heat away from the apparatus, whether conductive or convective. For example the cooling assembly can include a conventional air-cooling system (e.g., Freon-based compressor, condenser, expansion valve, and evaporator), a circulating water bath, or a fan. Material with a suitable thermal conductivity can optionally be used to fashion the condensation layer 120, part of the condensation layer 120, part of a porous support layer 180, or can be in thermal contact with the condensation layer 120. The thermally conductive material will transport heat away from the condensation layer 120. A suitable thermal conductivity for the thermally conductive material could be at least 50 W/mK, at least 100 W/mK, at least 150 W/mK, at least 200 W/mK, at least 300 W/mK, or higher. A thermally conductive graphite foam can be used to form some part of the porous support layer 180 or to assist in conducting heat away from the wall. Commercial graphite foams are available with a variety of physical properties from Poco Graphite, Inc., 300 Old Greenwood Road, Decatur, Tex., 76234, and Koppers, LLC, 436 Seventh Avenue, Pittsburgh, Pa. 15219-1800.

Figure 3C:
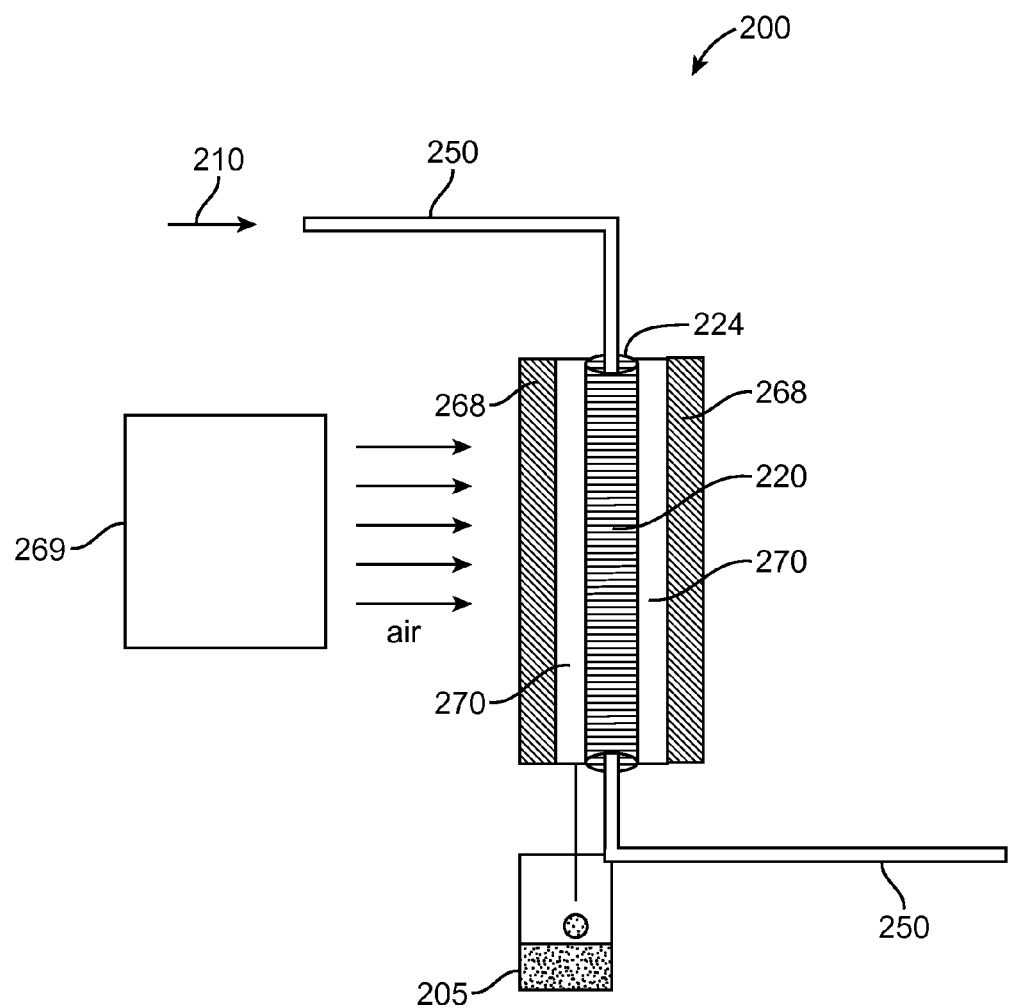
FIG. 3c is a schematic diagram of another exemplary reclamation apparatus.

FIGS. 3a, 3b, and 3c illustrate other embodiments of the apparatus 200 with various cooling assembly configurations. FIGS. 3a, 3b, and 3c show the wall 220 provided in the form of a cylindrical duct 224. The first surface of the wall 220 can form the inner portion of the cylindrical duct 224; and the second surface of the wall 220 can form the outer portion of the cylindrical duct 224. A mixed gas stream 210 can travel through the mixed gas stream passageway 250, which passes through the interior opening of the cylindrical duct 224. A liquid collection assembly 270 can be positioned along the outer portion of the cylindrical duct 224 for collecting liquid 205 from the capillary condensation pores in the wall 220.

As shown in FIG. 3a, the cooling assembly of the apparatus 200 can include a conductive component 268 for carrying heat away from the wall 220 by conduction. The conductive component 268 can include materials with a thermal conductivity of at least 50 W/mK. For example, a heat conductive component can include materials such as copper, silver, gold, and synthetic materials such as graphite foam. The high heat conductivity graphite foam described in U.S. Pat. No. 6,033,506, which is incorporated by reference herein, may be used. In FIG. 2a, the graphite foam 268 can cover at least a portion of the liquid collection assembly 270, which surrounds the wall 220.

As shown in FIG. 3b, the cooling assembly of the apparatus 200 can also include a convective component 269 for carrying heat away from the wall 220 by convection. The convective component 269 can include a fan for flowing a coolant such as air, for example, over at least a portion of the wall 220 or over at least a portion of any structure or chamber in contact with the wall 220. In one instance, the fan can be powered by energy from an engine, heat from an exhaust, or another suitable and available power source.

As shown in FIG. 3c, the cooling assembly of the apparatus 200 can also include both a heat conductive component 268 and a convective component 269. In FIG. 2c, the heat conductive component 268 can cover at least a portion of the liquid collection assembly 270, which surrounds the wall 220. Additionally, the convective component 269 can flow a coolant such as air over at least a portion of the heat conductive component 268 in order to dissipate the heat absorbed by the heat conductive component 268.

Figure 4:
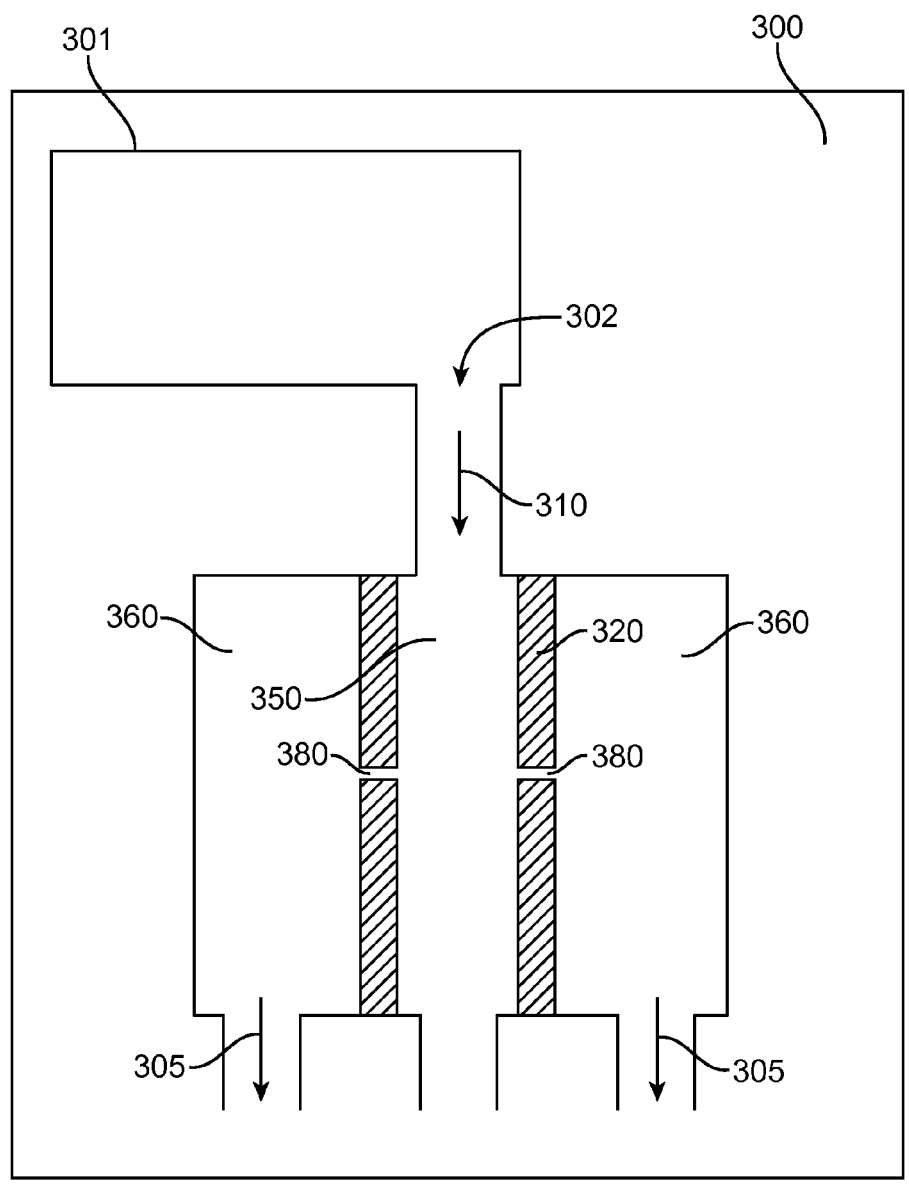
FIG. 4 is a schematic diagram of an exemplary reclamation system in a vehicle.

FIG. 4 illustrates an embodiment of the apparatus 100 included in a portion of a vehicle 300, although the invention is not limited to vehicles and has use wherever there are mixed gas streams with condensable components and where separation of those components from the mixed gas stream is useful. For example, the apparatus 100 may be installed on a generator in a remote area or in a manufacturing facility as part of a production process. The vehicle 300 can include a mixed gas generator such as an engine 301 with an exhaust outlet 302, an exhaust/mixed gas passageway 350 for directing exhaust/mixed gas 310, and a wall 320. The wall can include a first surface, a second surface, and a plurality of capillary condensation pores 380. The capillary condensation pores 380 extend through the wall, and have a first opening on the first surface of the wall, and a second opening on the second surface of the wall. The pores 380 can have a pore size between about 2 nm to about 100 nm. The exhaust outlet 302 of the engine 301 can be in fluid communication with the exhaust passageway 350. The vehicle 300 can include military vehicles, civilian vehicles, trucks, cars, ships, boats, trains, aircraft, spacecraft, or any other vehicle. The engine 301 can alternatively be attached to any stationary device which includes an engine, and has an exhaust stream, such as a turbine. The invention also has utility for other mixed gas streams such as those from a manufacturing process for example. The engine 301 can include internal combustion engines, such as diesel engines, gas turbines, or any other engine generating exhaust gases containing water. In one instance, the engine 301 can include an internal combustion engine, the mixed gas 310 can include water vapor, and the liquid 305 can include water.

The rate at which condensed water is removed from the pores should be at least as fast as the rate at which the water is condensed in the pores. The removal rate can be higher than the condensation rate but should not completely remove all liquid in a pore. In this manner, the contact time that the condensed water will have with contaminants in the mixed gas stream is reduced. The invention can thereby achieve not only favorable water reclamation, but also with a significant reduction in the amount of contaminants such as $NO_2$ that is dissolved in the reclaimed water as compared to the dissolution of water from thermodynamic condensation where dissolution of the contaminants is governed by equilibrium solubility limits and not contact time.

The porous condensation layer and the support layer can be fabricated according to known methods for forming porous membranes. Examples of such methods are discussed in Judkins' U.S. Pat. No. 7,484,626, and R. R. Bhave, Inorganic Membranes Synthesis, Characteristics and Applications, Van Nostrand Reinhold New York, N.Y. (1991), the disclosures of which are incorporated fully by reference. The porous support can be created by suitable techniques such as cold isostatic pressing of a dry powder, by co-extrusion of a paste of metallic or ceramic powder with binders and plasticizers, or by slip casting. Organic components are burned away and the product is sintered. The fine-grained condensation layer can then be applied by such techniques as painting, dip coating, and slip casting, and heat can be used to remove organics and to sinter the condensation layer particles. Other techniques for forming the porous support and the condensation layer can alternatively be used. It is known that multiple layers of porous supports are possible, and are included within the invention. A coarse material with large pores can form the support, and one or more additional layers of finer material with smaller pores can be layered onto the support prior to the condensation layer. Such intermediate layers fill larger voids in the coarse porous support and allow finer materials with smaller pores to be used for the condensation layer.

Figure 5:
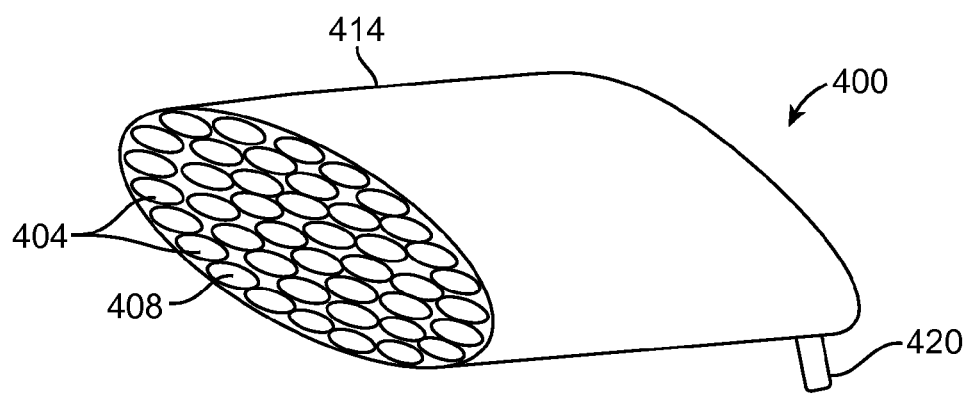
FIG. 5 is a schematic diagram of a multi-membrane module according to the invention.

Several reclamation devices according to the invention can be bundled to improve the separation efficiency of the apparatus. There is shown in FIG. 5 a multi-membrane module 400 having a plurality of tubular reclamation membranes 404, only the ends of which are illustrated in the figure. The mixed gas stream can pass through interior passageways 408. The membranes are contained within an outer housing 414. Liquid is condensed in the membranes 404 and flows to a collection port 420.

A method of separating a liquid from a mixed gas stream can include the steps of providing a mixed gas stream and providing a wall. The wall can include a first surface, a second surface, and a plurality of capillary condensation pores. The pores extend through the wall, and have a first opening on the first surface of the wall, and a second opening on the second surface of the wall. The pores can have a pore size between about 2 nm to about 100 nm. The method can include contacting the mixed gas stream with the pore through the first opening on the first surface of the wall, separating a liquid from the mixed gas stream by capillary condensation in the pore, and collecting the liquid exiting the second opening of the pore.

The contacting step can also include orienting the mixed gas stream to flow in a direction towards the first opening of the pore. As used herein, "towards" refers to any direction in which at least a portion of the mixed gas stream can contact the first opening of the pore. For example, the orienting step can include flowing at least a portion of the mixed gas stream along the first surface of the wall such that at least a portion of the mixed gas stream contacts the first opening of the pore in the wall.

The separating step can also include adsorbing a portion of the liquid to the inner surface of the pore, condensing liquid within the pore, and forming a meniscus between the liquid and the mixed gas stream. The separating step can also include separating water as the liquid from a mixed gas stream that comprises engine exhaust.

The method can also include cooling at least a portion of the wall. In one instance, the mixed gas stream can have an initial temperature of between about 150° C. to 400° C. and the wall can be cooled to a temperature of between about 30° C. to 60° C. The method can also include filtering the mixed gas stream upstream of at least one pore. As described above, filtering the mixed gas stream can include filtering out at least a portion of particulates or other contaminants from the mixed gas stream. The mixed gas stream can include an exhaust stream of an internal combustion engine. The flow rate of the exhaust stream can vary. In one instance, the exhaust gas stream can include a flow rate between about 3600 L/min and 14000 L/min, although the flow rate will vary with the size and rpms of the engine.

The apparatus and methods disclosed herein include a minimal number of working parts and thus reduce the amount of energy required for reclamation of a liquid from a mixed gas stream. Capillary condensation by the apparatus and methods disclosed herein allows a higher water reclamation yield compared to standard thermodynamic condensation due to the concave meniscus that forms when water condenses in the pores. As water adsorbs to an inner surface of a pore, the adsorbed layers become a nucleus on which water can condense. After liquid condensation occurs within a pore, a concave meniscus forms between the liquid and gas phases. When a vapor exists over a concave meniscus of liquid, the equilibrium vapor pressure will be less than the saturation pressure. The resulting lower equilibrium vapor pressure results in a greater percentage of the water vapor condensing out of the mixed gas stream without needing to lower the temperature. As shown in FIG. 6, the performance of capillary condensation to remove liquids from mixed gas streams can exceed that available from thermodynamic condensation, and with much greater reduction in contaminant levels.

EXAMPLES

Experiments were conducted on the apparatus and methods described herein to evaluate the water reclamation yield from a mixed gas stream of air and water or air, water and $NO_2$.

A. Wall Fabrication

A condensation layer was fabricated from alumina with controlled pore sizes. The physical pore diameter of the pores in the condensation layer was approximately 8.5 nm. The condensation layer was ~5 μm thick.

A thin porous metallic support layer was fabricated from 400 series stainless steel. The physical diameter of the pores in the porous support layer was approximately 4.2 μm. The porous support layer was ~0.5 mm thick. The ferritic nature of 400 series steel will increase thermal conductivity helping to more efficiently cool the membrane as compared to austenitic stainless steels such as 316L.

B. Platform Testing

The desired gas stream was simulated using mass flow controllers (MFCs) to meter the desired dry gas components. In order to introduce a controlled volume of water vapor into the gas stream, a water pump was used to drip water into a heated gas line. The wall was placed in a double layer holder which has an outer chamber used to pump coolant while the inner chamber created a space directly outside of the support layer on the second surface of the wall to collect and transfer the water collected from the gas stream. Humidity detectors placed before and after the wall were used along with direct volumetric measurement of the collected water to determine the efficiency of the apparatus for reclaiming water from the gas stream.

A gas stream with 8-9 vol % water vapor and 500 ppm $NO_2$ content was flowed at a rate of ~2.5 mL/min through a single 9" length piece of wall with support layer, preserving the gas flow to membrane contact ratio. The gas stream was heated to ~200° C. for a wall apparatus similar to FIG. 3a, and a circulating water bath was used to cool the wall temperature to approximately 20° C. The recovery of water from the mixed gas stream was about 68%, with as much as a 100 fold reduction in $NO_2$ dissolution compared to water reclaimed by standard thermal condensation.

The apparatus and methods disclosed herein can result in water reclamation yields of at least 50%, at least 55%, at least 58%, at least 60%, at least 62%, at least 65%, at least 67%, and at least 68% of the water vapor contained in the mixed gas stream as liquid water.

In the foregoing detailed description of the preferred embodiments, reference is made to the accompanying drawings, which form a part hereof, and within which are shown by way of illustration for the practice of specific embodiments of apparatus and methods for separating liquid from a mixed gas stream. It is to be understood that other embodiments may be utilized, and that structural changes may be made and processes may vary in other embodiments.

We claim:

1. An apparatus for separating a liquid from a mixed gas stream comprising:
    a condensation layer having a first surface, a second surface, and a plurality of capillary condensation pores; wherein the pores extend through the condensation layer, the pores having a first opening on the first surface of the condensation layer, a second opening on the second surface of the condensation layer, and a pore size between about 2 nm to <10 nm and a pore length of less than 100 μm;
    a mixed gas stream passageway in fluid communication with the first opening; and
    a liquid collection assembly for collecting liquid from the pores.

2. The apparatus according to claim 1, wherein the pore size of the pores is between about 5 nm to about 8 nm.

3. The apparatus according to claim 1, wherein the condensation layer comprises a porous support layer.

4. The apparatus according to claim 3, wherein the pores of the porous support layer have a pore size of between about 0.1 and 50 μm.

5. The apparatus according to claim 3, wherein the porous support layer has a thickness between 0.1 mm and 4 mm, and the condensation layer has a thickness of between 1 and 100 μm.

6. The apparatus according to claim 1, wherein the liquid collection assembly further comprises:
    a collection chamber for collecting the liquid from the second opening; and a liquid pump for removing liquid from the collection chamber.

7. The apparatus according to claim 1, wherein the pressure difference between the collection chamber and the mixed gas stream passageway is between about 1 and 14.7 psi.

8. The apparatus according to claim 1, further comprising a cooling assembly for cooling at least a portion of the condensation layer.

9. The apparatus according to claim 1, wherein the cooling assembly comprises a conductive component, wherein a thermal conductivity of the conductive component is at least 50 W/mK.

10. The apparatus according to claim 9, wherein the conductive component comprises a graphite foam.

11. The apparatus according to claim 8, wherein the cooling assembly comprises a convective component.

12. The apparatus according to claim 11, wherein the convective component comprises a fan for flowing air over at least a portion of the condensation layer.

13. The apparatus according to claim 1, further comprising a filter assembly positioned upstream of the pores to remove particulates from the mixed gas stream.

14. The apparatus according to claim 1, further comprising an engine;
wherein the engine comprises an exhaust outlet; and
wherein the mixed gas stream passageway is in fluid communication with the exhaust outlet.

15. The apparatus according to claim 14, wherein
the engine comprises an internal combustion engine;
the mixed gas stream comprises water vapor; and
the liquid comprises water.

16. A vehicle comprising:
an internal combustion engine having an exhaust outlet;
an exhaust passageway; and
a condensation layer having a first surface, a second surface, and a plurality of capillary condensation pores; wherein the capillary condensation pores extend through the condensation layer, and have a first opening on the first surface of the condensation layer, a second opening on the second surface of the condensation layer, and a pore size between about 2 nm to <10 nm and a pore length of less than 100 µm;
wherein the exhaust outlet is in fluid communication with the exhaust passageway; and
wherein the exhaust passageway is in fluid communication with the first opening.

17. A method of separating a liquid from a mixed gas stream comprising the steps of:
providing a mixed gas stream;
providing a condensation layer having a first surface, a second surface, and a plurality of capillary condensation pores; wherein the capillary condensation pores extend through the condensation layer, and have a first opening on the first surface of the condensation layer, a second opening on the second surface of the condensation layer, and a pore size between about 2 nm to <10 nm and a pore length of less than 100 µm;
contacting the mixed gas stream with the pores through the first opening on the first surface of the condensation layer;
separating a liquid from the mixed gas stream by capillary condensation in the pores; and
collecting the liquid exiting the second opening of the pores.

18. The method according to claim 17, wherein the mixed gas stream comprises an exhaust stream of an engine.

19. The method according to claim 18, wherein the exhaust stream has a flow rate between about 3600 L/min and 14000 L/min.

20. The method according to claim 17, wherein a pore size of the pores is between about 5 nm to 8 nm.

21. The method according to claim 17, wherein the separating step further comprises
adsorbing a portion of the liquid to the inner surface of the pores;
condensing liquid within the pores; and
forming a meniscus between the liquid and the mixed gas stream.

22. The method according to claim 17, wherein the separating step further comprises separating water as the liquid.

23. The method according to claim 17, further comprising the step of cooling at least a portion of the condensation layer.

24. The method according to claim 17, wherein
the mixed gas stream has an initial temperature of between about 150° C. to 400° C.; and
the step of cooling comprises cooling at least a portion of the condensation layer to a temperature of between about 30° C. to 60° C.

25. The method according to claim 17, further comprising the step of filtering the mixed gas stream upstream of the pores.

* * * * *